United States Patent
Schauss

Patent Number: 5,251,073
Date of Patent: Oct. 5, 1993

[54] HIGH-APERTURE WIDE ANGLE LENS

[75] Inventor: Udo Schauss, Waldböckelheim, Fed. Rep. of Germany

[73] Assignee: Jos. Schneider Optische Werke Kreuznach GmbH & Co. KG, Bad Kreuznach, Fed. Rep. of Germany

[21] Appl. No.: 750,869

[22] Filed: Aug. 28, 1991

[30] Foreign Application Priority Data

Aug. 29, 1990 [DE] Fed. Rep. of Germany ....... 4027273
Aug. 27, 1991 [DE] Fed. Rep. of Germany ....... 4128435

[51] Int. Cl.$^5$ .................................................. G02B 3/02
[52] U.S. Cl. ..................................... 359/715; 359/708; 359/713; 359/714
[58] Field of Search ............... 359/708, 713, 714, 619, 359/715, 716

[56] References Cited

U.S. PATENT DOCUMENTS

| | | | |
|---|---|---|---|
| 4,806,001 | 2/1989 | Okabe et al. | 359/708 |
| 4,867,546 | 9/1989 | Nishioka et al. | 359/714 |
| 5,087,989 | 2/1992 | Igarashi | 359/708 |

Primary Examiner—Bruce Y. Arnold
Assistant Examiner—Hung Xuan Dang
Attorney, Agent, or Firm—Herbert Dubno

[57] ABSTRACT

A high-aperture wide angle lens consisting of a divergent action group on the lens side, an air space corresponding to 0.3 to 0.7 times or 0.25 times to 0.45 times the total overall height of the wide angle lens, an aperture diaphragm located approximately in the center, followed by a positive lens group consisting of a cemented element with total positive refractive power and a second convergent action group whereby the divergent action group on the lens side, and the second divergent action group each possess at least one aspherical surface. In such a four-lens or six-lens structural design, a typical image field angle of 130| or 146| or more is achieved at an f-stop of approximately 2.0. The high-aperture wide angle lens is particularly suited as a photographic field lens for electronic image processing systems such as CCD cameras.

10 Claims, 6 Drawing Sheets

FIG.1

DISTORTION GRATING

DISTORTION GRATING

DISTORTION GRATING

HIGH-APERTURE WIDE ANGLE LENS

FIELD OF THE INVENTION

The present invention relates to a high aperture wide angle lens consisting of an initial divergent action group with considerable effect on the correction of distortion and relative luminous intensity, an air space, an aperture diaphragm located approximately in the center with vignetting action essential for correction in the image field, a subsequent convergent action group, consisting of a cemented element, and a convergent action group with an effect on spherical aberration and the image field convexity.

BACKGROUND OF THE INVENTION

Classical wide angle lenses with high apertures generally have more than six lenses, in which, as a result of the use of negative refractive power in the front section, a focal intercept length is maintained that is large relative to the focal distance, while the relative luminous intensity is increased through the intentionally introduced aperture diaphragm aberration with increasing image angle. As the expert knows, the characteristic design of the front element is a result of a compromise in respect to distortion correction and the introduction of aperture diaphragm aberration. Given the restriction to spherical surfaces in the design of high aperture lenses with large image angle, acceptable image quality can be achieved only through the use of a large number of lenses. By utilizing aspherical surfaces, the number of lenses can be decreased through the corrective degrees of freedom associated with this.

5-lens designs with a maximum image angle of 85 are described in DE-OS 25 47 713. 3- to 7-lens wide angle systems for endoscopes are presented in DE-OS 36 00 573; the 4-lens systems discussed in the latter attain a maximum image of 95°, and the 5-lens system mentioned has an image angle of 106°, whereas the 6- and 7-lens wide angle systems possess a maximum image angle of 120°. Accordingly, it should be borne in mind that, to date, a maximum image angle of only 95° was attained when using a 4-lens solution.

OBJECT OF THE INVENTION

The object of this invention is to provide an extremely wide angle lens with great light transmitting capacity, with the smallest possible lens diameter and a minimum number of lenses, primarily for CCD cameras.

SUMMARY OF THE INVENTION

In terms of the invention, this is achieved since the negative refracting action of the first divergent action group is continuously decreased starting from the optical axis and extending to the edge through the use of at least one aspherical surface, while the positive refracting action of the convergent action group or of an image-near positive lens is continuously decreased starting from the optical axis to the edge through the use of an aspherical surface. Preferably, the air space between the first divergent action group and the image-side convergent action group following the aperture diaphragm, is at least three times as great as the total focal distance.

Preferably, the air space between the first divergent action group and the image-side positive action group in one structural design can correspond to approximately 0.3 to 0.7 times the total overall height of the wide-angle lens, while, in another structural design, it can correspond to approximately 0.25 to 0.45 times the total overall height of the wide angle lens.

A cemented element following the aperture diaphragm with a total positive refractive power is used advantageously for corrective action on color aberration and the Petzval sum.

The cemented element can conveniently consist of a lens-side positive lens and an image-side negative lens.

A positive lens following this cemented element can advantageously possess another aspherical surface.

With the design described, a typical image field angle of at least approximately 130° at an f-stop of approximately 2.0 is mostly achieved in one structural design, and a typical image field angle of at least approximately 146° at an f-stop of approximately 2.0 in another structural design.

As a result of the design control of aperture diaphragm aberration and the introduction of a dimensioned distortion, the relative luminous intensity can be at least as great as that in a lens with natural brightness loss ($\cos^{**}4$). Mostly, however, the relative luminous intensity is clearly increased with respect to the natural brightness loss using the design control of aperture diaphragm aberration and the introduction of dimensioned distortion.

Furthermore, further advantageous developments and forms of construction result when the image field angle is at least 125° and preferably 125° to 150°.

Through the invention, a high-aperture wide angle lens with a minimum number of lenses, preferably with a four-lens or six lens design, is created, which possesses an extremely wide image angle and a surprisingly good image quality.

The refractive power distribution is selected in such a way as to ensure that the focal intercept length on the image side is clearly larger that the total focal distance of the system. Thus the wide angle system consists of a lens-side action group with strong negative refractive power and an image-side action group with strong positive refractive power, separated by large clearance, in a lens design with approximately equal free diameters on the lens-side and the image-side action group, with a resulting minimum total lens diameter.

The relative luminous intensity in the image field was increased as a result of widening the entrance pupil as well as from purposeful dimensioning of the distortion.

In order to increase the correcting degrees of freedom with a minimum number of lenses, at least one aspherical surface was introduced both in the action group on the lens side as well as in the action group on the image side.

The refractive action of the lens-side action group is formed from the shaping of the inserted aspherical surface in such a way that the refractive action of this action group is decreased starting from the optical axis and extending to the edge.

To guarantee high image quality, the action group on the image side must be designed either with a minimum of three-lenses and at least one aspherical surface, or with a minimum of four-lenses and at least one aspherical surface.

As a result of fixing the first two lenses in the image-side action group as a cemented element, and of introducing at least one aspherical surface in the last, individually located positive lens, the bundle of rays can be directed in such a way that a minimum lens diameter and optimal correction is achieved.

The aperture diaphragm located roughly in the center of the clearance between the lens-side action group and the image-side action group limits the bundle cross section to approximately 0.8 times the maximum image size, and achieves an improvement in image quality and, under certain circumstances, also in relative luminous intensity.

The high-aperture wide angle lens as per the invention is primarily suited as a photographic field lens used in electronic image processing systems such as CCD-cameras.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
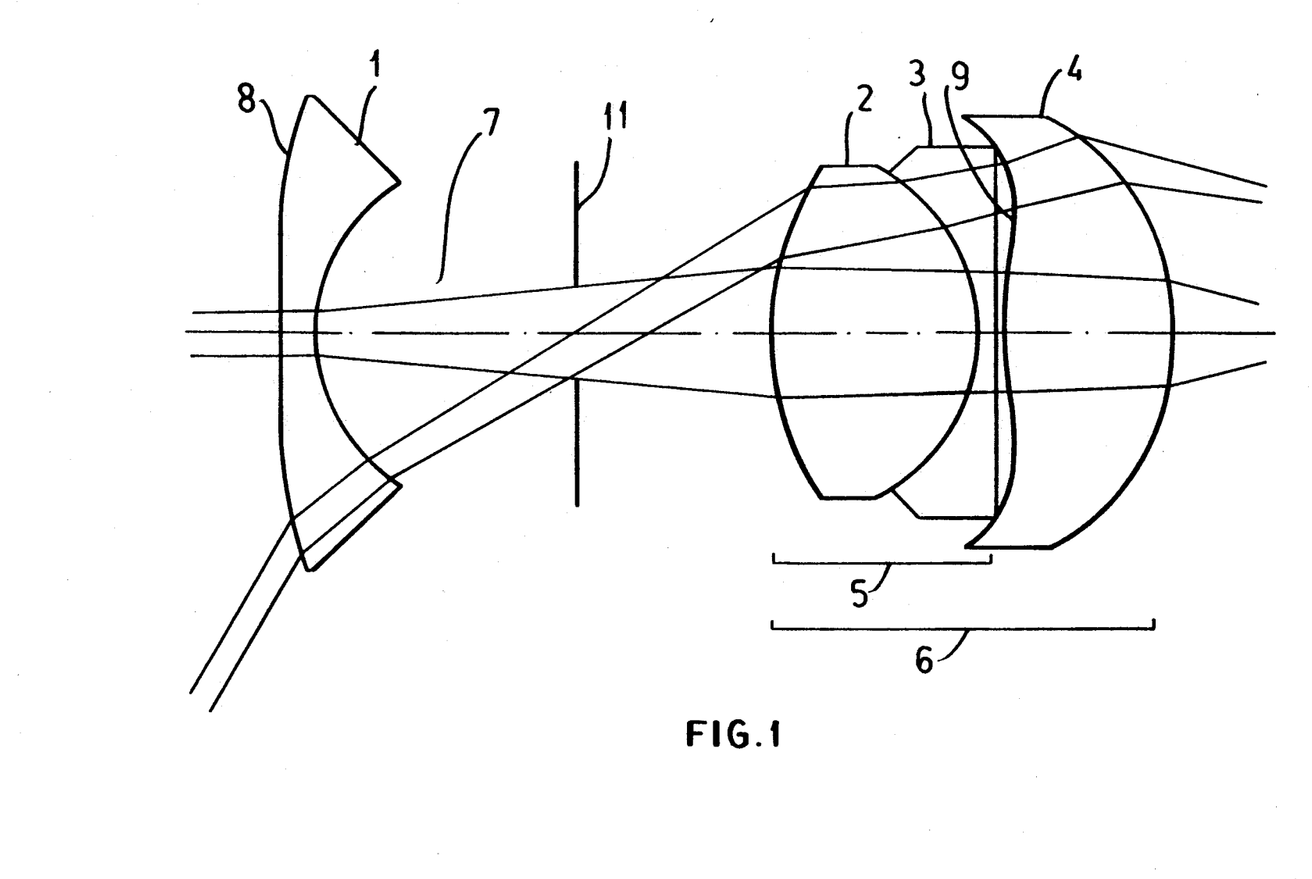
FIG. 1 is a lens cross-section of the first embodiment of a high-aperture wide angle lens in accordance with the invention.

A preferred embodiment of the invention is depicted in FIG. 1. According to the above, the high-aperture wide angle lens consists of two action groups separated by a relatively large clearance. 1 depicts the first divergent action group, possessing an aspherical surface 8 on its lens side. 7 depicts the air space between the first action group 1 and the second action group 6. The aperture diaphragm 11 is situated approximately in the center of the clearance between the first divergent action group 1 and the positive lens group 6. The positive action group 6 on the image side consists of a cemented element 5, made up of a lens-side positive lens 2, and an image-side negative lens 3, whereby the cemented element 5 demonstrates a total positive refractive power and corrective action on color distortion and Petzval curvature, and a positive lens 4 with action on the spherical aberration and the image field convexity, whose surface 9 is aspherical. The cemented element 5 and the positive lens 4 are separated by a small clearance. Due to the aspherical surface 8, the negative refractive action of the first divergent action group 1 is continuously decreased starting from the optical axis and extending to the edge, while, due to the aspherical surface 9, the positive refractive action of positive lens 4 is continuously decreased starting from the optical axis and extending to the edge.

Figure 5:
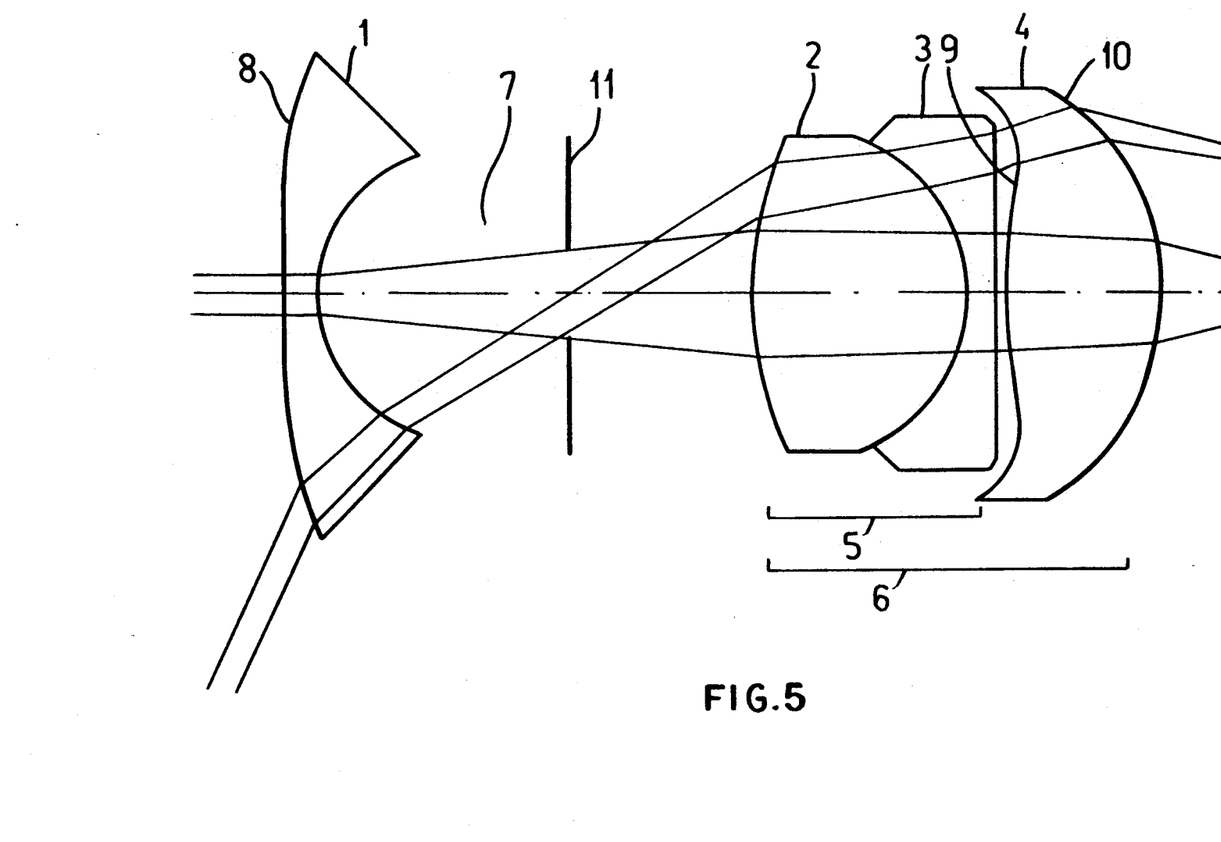
FIG. 5 is a lens cross-section of a second embodiment of a high-aperture wide angle lens in accordance with the invention.

The second embodiment of the invention illustrated in FIG. 5 differs from the first embodiment illustrated in FIG. 1 only in that the positive lens 4 also has an aspherical surface 10 on the image side and that the—also small—clearance between the cemented element 5 and the positive element 4 is somewhat larger than in the case of the example of construction in FIG. 1. Apart from this, the same reference numbers indicate the same parts in FIG. 5 as those in FIG. 1.

Due to the negative refractive power of lens group 1 on the lens or object side, and the positive refractive power of lens group 6 on the image side, in combination with the large air space 7 found between, a long focal intercept length—in comparison to the focal distance—typical for the retrofocus system, is obtained. The maximum free diameter of the lenses is approximately five times as great as the total focal distance. An aperture diaphragm 11 is situated approximately in the center of air space 7 following action group 1 on the lens side. Action group 1 on the lens side with negative refractive power is advantageously designed as an aspherical lens. Due to the influence of this aspherical surface 8, the divergent action of this lens is decreased starting from the optical axis and extending to the edge.

In action group 6 on the image side, it is advantageous to design the latter with at least three lenses and at least one aspherical surface 9. The three-lens, image-side action group 6 preferably contains on the lens side a cemented element 5 consisting of positive lens 2 and negative lens 3, followed by a positive lens 4, separated by a small clearance.

At least the first surface 9 or second surface 10 (FIG. 5) of this positive lens 4 is designed as an aspherical surface to obtain a good correction given an extremely small total number of lenses—extending over a very large image field angle. A particularly good correction is achieved if, as illustrated in the embodiment in FIG. 5, both surfaces 9 and 10 of this positive lens are aspherical, whereby the positive divergent action of this lens continuously decreases starting from the optical axis and extending to the edge.

Through the aspherical surface 8 in the lens-side action group 1, the distortion and aperture diaphragm aberration are essentially corrected to advantageous values.

The introduction of one or two aspherical surfaces in the action group on the image side is particularly suited for the correction of aperture distortion and the leveling of the image field.

With a preferred four-lens structural design, an image angle of 132°, i.e., greater than 130°, with an f-stop of 2.0 is achieved, whereby the monochromatic as well as the color distortion were largely corrected with a minimum number of lenses.

In the described embodiments, the relative luminous intensity is at least twice as great as for a lens with natural brightness loss ($\cos^{**}4$), due to the structural control of the aperture diaphragm aberration and the introduction of dimensioned distortion.

Figure 2:
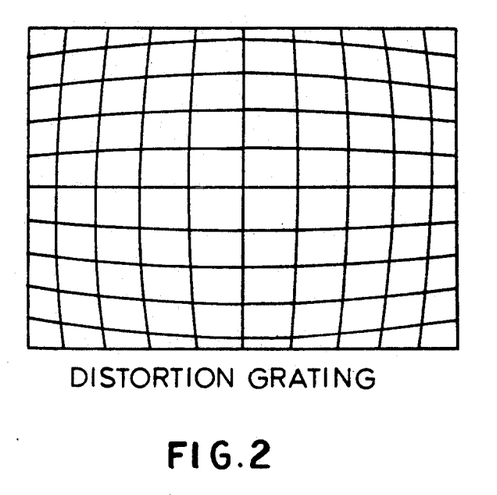
FIG. 2 is a distortion-afflicted diagram of a rectangular lens grating of the first embodiment of a high-aperture wide angle lens in accordance with the invention.
Figure 3:
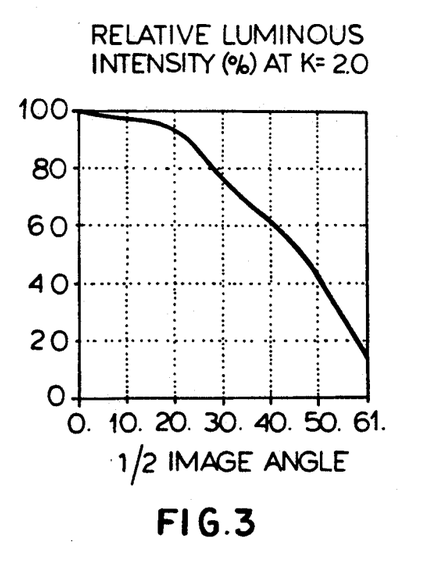
FIG. 3 is a graph of the relative luminous intensity as a function of the image angle of the first embodiment of a high-aperture wide angle lens in accordance with the invention.
Figure 4:
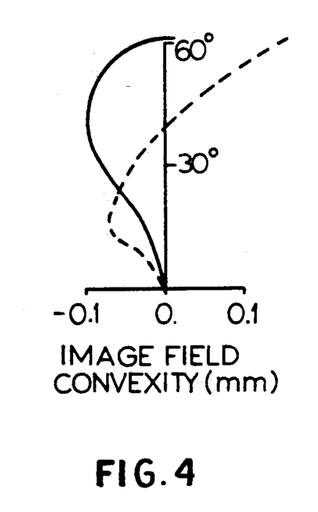
FIG. 4 is a graph of the effective image field convexity for the sagittal and meridional image field curvature as a function of the image angle of the first embodiment of a high-aperture wide angle lens in accordance with the invention.
Figure 6:
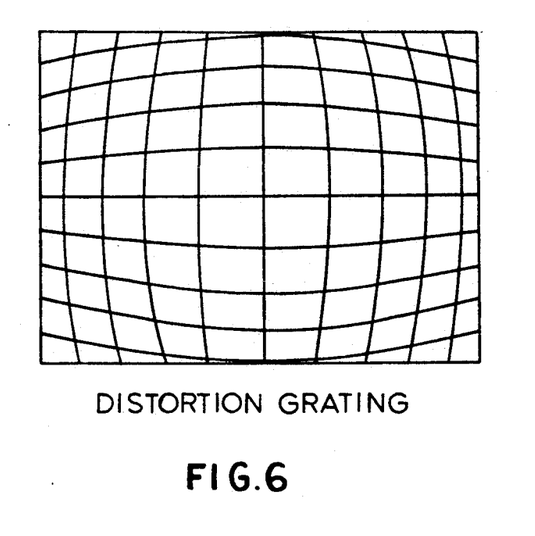
FIG. 6 is a diagram of a distortion-afflicted image of a rectangular lens grating of the second example of construction of a high-aperture wide angle lens in accordance with the invention.
Figure 7:
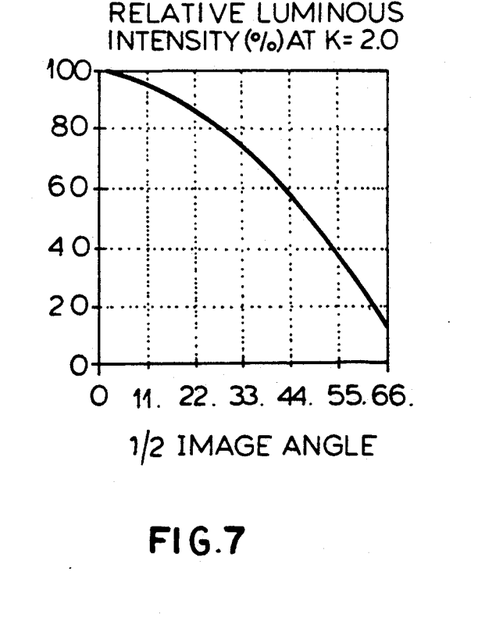
FIG. 7 is a graph of the relative luminous intensity as a function of the image angle of the second embodiment of a high-aperture wide angle lens in accordance with the invention.
Figure 8:
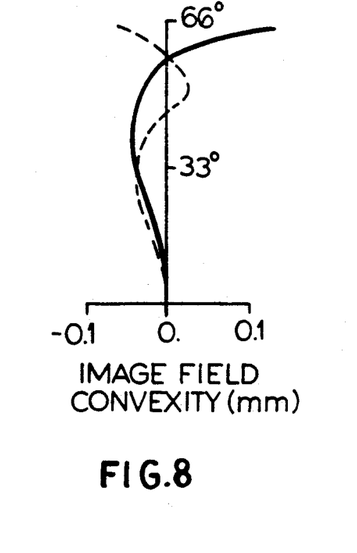
FIG. 8 is a graph of the effective image field convexity for the sagittal and meridional image field curvature as a function of the image angle of the second embodiment of a high-aperture wide angle lens in accordance with the invention.

As already stated, FIGS. 2, 3, and 4 refer to the embodiment of FIG. 1; and FIGS. 6, 7, and 8 refer, as already stated, to the embodiment of FIG. 5.

Figure 9:
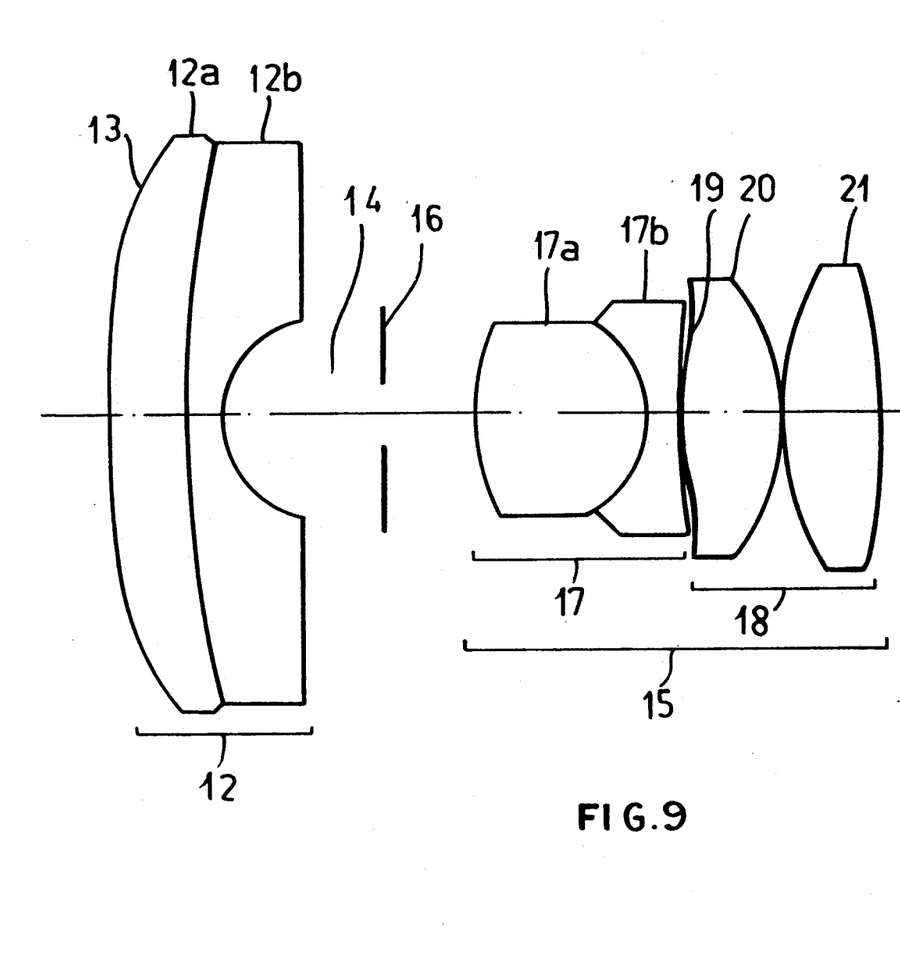
FIG. 9 is a lens cross-section of a third embodiment of a high-aperture wide angle lens in accordance with the invention.

A third embodiment of the invention, superior even to the first in FIG. 1, and the second in FIG. 5, and therefore particularly preferred, as illustrated in FIG. 9. According to this, the high-aperture wide angle lens consists of two action groups that are separated by a relatively large air space 14. 12 designates the first divergent action group consisting of a convergent meniscus 12a and a divergent meniscus 12b, which are cemented together and possess aspherical surface 13 on the lens side. 14 depicts the air space between the first action group 12 and the second action group 15. The aperture diaphragm 16 is situated approximately in the center of the clearance between the first divergent action group 12 and the positive lens group 15. The positive action group 15 on the image side consists of a cemented element 17, which consists of a positive lens 17a on the lens side and a negative lens 17b on the image side, whereby cemented element 17 possesses total positive refracting power and corrective action on color distortion and Petzval curvature, and the convergent action group 18 with action on spherical aberration and image field convexity, where one surface 19 is aspherical. The cemented element 17 and the convergent action group 18 are separated by a small clearance. As a result of aspherical surface 13, the negative refracting action of the first divergent action group 12 is decreased continuously starting from the optical axis and extending to the edge, whereas, as a result of aspherical surface 19, the positive refractive action of the convergent action group 18, consisting of biconvex lenses 20 and 21, is continuously decreased starting from the optical axis and extending to the edge.

Due to the negative refractive power of the action group 12 on the lens side, and the positive refractive power of the action group 15 on the image side, in combination with the large air space 14 between them, a long focal intercept length is obtained, which is typical for a retrofocus system, but long in comparison to focal distance. Aperture diaphragm 16 is located approximately in the center of the clearance 14, following action group 12 on the lens side. Preferably the lens-side action group 12 with negative refractive power contains an aspherical surface 13. Due to the influence of the aspherical surface 13, the refractive action of the action group 12 on the lens side is decreased, starting from the optical axis and extending toward the edge.

In action group 15 on the image side it is beneficial to design the latter with at least 4 lenses, each with at least one aspherical surface 19. The four-lens image-side action group 15 preferably contains a cemented element of a positive lens 17a and a negative lens 17b on the lens side and, separated by a small air space, an action group 18 consisting of two positive lenses 20 and 21.

At least one lens surface of action group 18, for instance surface 19, is designed as an aspherical surface to obtain a good correction given an extremely low total number of lenses extending over a very large image field angle. As a result of the shape of the aspherical surface 19, the positive refracting action of action group 18 continuously decreases starting from the optical axis and extending to the edge.

The distortion and the aperture diaphragm aberration are essentially corrected in an expedient manner, due to the aspherical surface 13 in the lens-side action group 12.

The introduction of at least one aspherical surface in the image-side action group 15 is particularly appropriate for the correction of aperture distortions and for the leveling of the image field.

With a preferred six-lens structural design, an image angle of 148° at an f-stop of 2.0 is obtained, whereby monochromatic and color distortion were largely corrected with a minimum number of lenses.

In the described embodiment, the relative luminous intensity is clearly larger than in a lens with natural brightness loss ($\cos^{**}4$), due to design control of aperture diaphragm distortion and the introduction of a dimensioned distortion.

Figure 10:
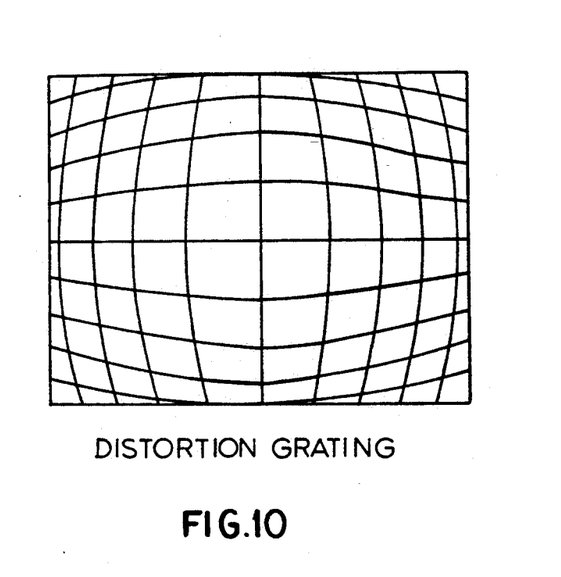
FIG. 10 is a diagram of a distortion-afflicted image of a rectangular lens grating of the third example of construction of a high-aperture wide angle lens in accordance with the invention.
Figure 11:
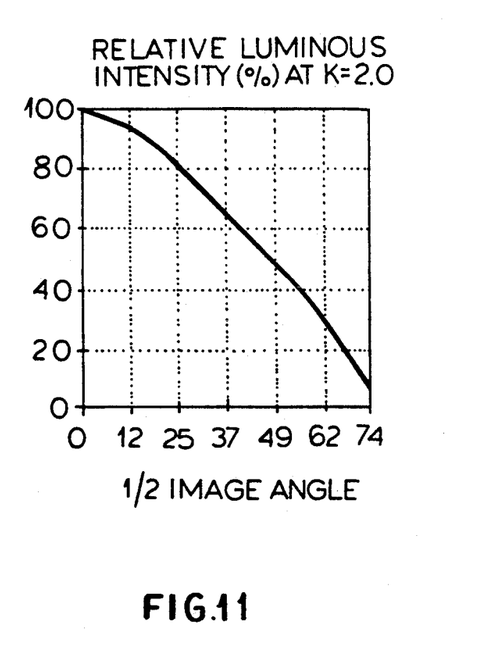
FIG. 11 is a graph of the relative luminous intensity as a function of the image angle of the third embodiment of a high-aperture wide angle lens in accordance with the invention.
Figure 12:
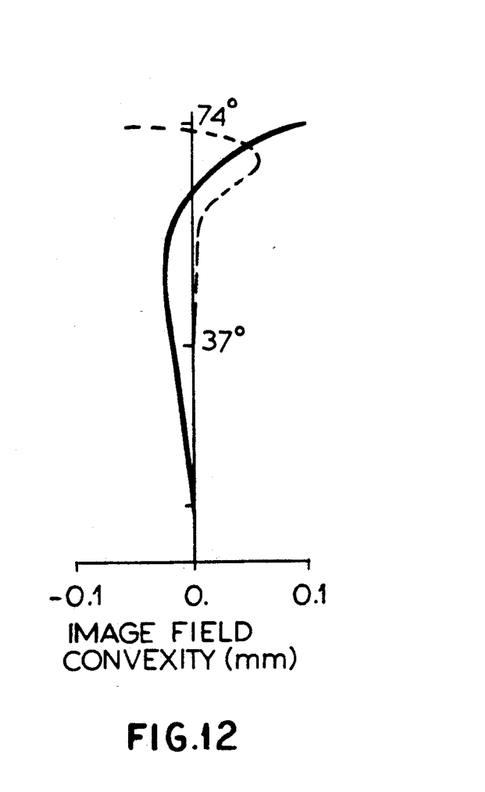
FIG. 12 is a graph of the effective image field convexity for the sagittal and meridional image field curvature as a function of the image angle of the third embodiment of a high-aperture wide angle lens in accordance with the invention.

FIGS. 10, 11, and 12, as already stated, refer to the example of construction in FIG. 9.

In the three examples of construction of the invention, at an f-stop of 2.0, image angles of approximately 125 degrees (125°) to approximately 150 degrees (150°) were obtained, whereby the image angle is to be understood as the total image angle occurring on both sides of the optical axis.

The numerical data of high-aperture wide angle lens, in accordance with the invention, are presented in the following Tables I, II, and III for FIGS. 1, 5 and 9:

TABLE I

| | | |
|---|---|---|
| r 1 = 1470.82 (aspherical) | | |
| d 1 = 1.21 | n 1 = 1.7292 | v 1 = 54.70 |
| r 2 = 5.902 | | |
| d 2 = 9.00 | | |
| r 3 = ∞ | | |
| d 3 = 6.56 | | |
| r 4 = 10.15 | | |
| d 4 = 7.00 | n 2 = 1.6405 | v 2 = 60.10 |
| r 5 = −6.32 | | |
| d 5 = 0.86 | n 3 = 1.8467 | v 3 = 23.83 |
| r 6 = −111.958 | | |
| d 6 = 0.10 | | |
| r 7 = 14.87 (aspherical) | | |
| d 7 = 5.79 | n 4 = 1.7725 | v 4 = 49.60 |
| r 8 = −8.64 | | |
| F = 2.997 | 2w = 122 degrees | |
| Aspherical coefficients of the first surface | | |
| K (cone constant) = 0 | | |
| D $0.340428 \times 10^{-3}$ | | |
| E $-0.432607 \times 10^{-5}$ | | |
| F $0.576946 \times 10^{-6}$ | | |
| G $-0.356679 \times 10^{-9}$ | | |
| Aspherical coefficients of the seventh surface | | |
| K (cone constant) = 0 | | |
| D $-0.852530 \times 10^{-3}$ | | |

TABLE I-continued

E −0.947159 × 10⁻⁵
F 0.151413 × 10⁻⁶
G −0.139941 × 10⁻⁸

TABLE II r 1 = 381.611 (aspherical)
d 1 = 1.17    n 1 = 1.7292    v 1 = 54.70
r 2 = 5.088
d 2 = 8.64
r 3 = ∞
d 3 = 6.19
r 4 = 12.53
d 4 = 7.30    n 2 = 1.7725    v 2 = 49.60
r 5 = −5.64
d 5 = 0.86    n 3 = 1.8467    v 3 = 23.83
r 6 = 279.392
d 6 = 0.40
r 7 = 13.954 (aspherical)
d 7 = 5.27    n 4 = 1.7292    v 4 = 54.70
r 8 = −8.48 (aspherical)
F = 2.762                     2w = 132 degrees Aspherical coefficients of the first surface K (cone constant) = 0
D 0.315830 × 10⁻³
E −0.192608 × 10⁻⁵
F 0.849578 × 10⁻⁸

Aspherical coefficients of the seventh surface

K (cone constant) = 0
D −0.767120 × 10⁻³
E 0.458289 × 10⁻⁵
F −0.359959 × 10⁻⁶
G 0.204217 × 10⁻⁸

TABLE III r 1 = 226.231 (aspherical)
d 1 = 2.60    n 1 = 1.7847    v 1 = 25.76
r 2 = 43.600
d 2 = 1.20    n 2 = 1.8032    v 2 = 46.38
r 3 = 3.490
d 3 = 5.48
r 4 = ∞
d 4 = 3.13
r 5 = 8.766
d 5 = 5.63    n 3 = 1.8042    v 3 = 46.50
r 6 = −4.097
d 6 = 1.15    n 4 = 1.9176    v 4 = 21.51
r 7 = 27.650
d 7 = 0.08
r 8 = 11.004 (aspherical)
d 8 = 3.29    n 5 = 1.7433    v 5 = 49.20
r 9 = −8.212
d 9 = 0.03
r 10 = 10.765
d 10 = 3.32    n 6 = 1.7292    v 5 = 54.70
r 11 = −25.66
f = 1.846 mm                  2w = 148 degrees Aspherical coefficients of the first lens surface K (cone constant) = 0
D 0.310441 × 10⁻³
E −0.179084 × 10⁻⁵
F 0.710398 × 10⁻⁸

Aspherical coefficients of the eighth lens surface

K (cone constant) = 0
D −0.168858 × 10⁻²
E 0.244339 × 10⁻⁴
F −0.639913 × 10⁻⁶

Line of intersection definition of the aspherical surfaces:
For Tables I and II:
The aspherical surfaces are defined by the equation:

$$z = \frac{Cy^2}{1 + (1 - (1k + k)C^2y^2)^{\frac{1}{2}}} + Dy^4 + Ey^6 + Fy^8 + Gy^{10}$$

z = pitch in relation to the axial perpendicular plane
y = distance from the optical axis
k = cone constant
D, E, F, G = aspherical coefficients

TABLE III-continued

C = vertex curvature
For Table III
The aspherical surfaces are defined by the equation:

$$z = \frac{Cy^2}{1 + (1 - (1 + k)C^2y^2)^{\frac{1}{2}}} + Dy^4 + Ey^6 + Fy^8$$

z = pitch in relation to the axial perpendicular plane
y = distance from the optical axis
k = cone constant
D, E, F = aspherical coefficients
C = vertex curvature claims:

1. A high-aperture wide-angle lens assembly, comprising:
    a divergent front lens group consisting of at least one lens with considerable effect on distortion correction and relative luminous intensity having a negative refraction decreasing continuously from an optical axis of said assembly outwardly to an edge thereof and with an aspherical front surface;
    a relatively large air space following said front lens group and having a thickness of at least three times an overall focal length of the assembly;
    a rear lens group separated by said relatively large air space from said front lens group and consisting of at least three lenses including:
        a first convergent lens group consisting of a cemented element, and
        a second convergent lens group separated by a small air space from said first convergent lens group and having an effect on spherical aberration and image field convexity, said rear lens group having a positive refracting action continuously decreasing from said optical axis outwardly to an edge by reason of at least one aspherical surface of said second convergent lens group facing said cemented element, said cemented element consisting of two lenses; and
    an aperture diaphragm with vignetting action located substantially at the center of the thickness of said relatively large air space for image field correction, said divergent front lens group consisting of a single lens having a front surface which is aspherical and of a radius r 1, a thickness along said axis d 1, a refractive index n 1 and an Abbe coefficient v 1, and a rear surface with a radius of curvature r 2, said relatively large air space having a thickness d 2 between said front lens group and said diaphragm and a thickness d 3 from said diaphragm to a front surface of said cemented element, said diaphragm having an effective radius of curvature r 3, said front surface of said cemented element having a radius r 4 of a front lens of said cemented element with a thickness d 4 along said axis, a refractive index n 2 and an Abbe coefficient v 2, a rear surface of said front lens of said cemented element and a front surface of a rear lens thereof having a radius r 4, said rear lens having a thickness along said axis d 5, a refractive index n 3 and an Abbe coefficient v 3, a rear surface of said rear leans of said cemented element having a radius r 6 and being separated by said small air space d 6 from an aspherical front surface of said second convergent lens group having a radius r 7, a thickness d 7, a refractive index n 4, an Abbe coefficient v 4 and a rear surface with a radius r 8, the lens assembly being characterized by the following data ±5%:

```
r 1 = 1470.82 (aspherical)
d 1 = 1.21              n 1 = 1.7292       v 1 = 54.70
r 2 = 5.902
d 2 = 9.00
r 3 = ∞
d 3 = 6.56
r 4 = 10.15
d 4 = 7.00              n 2 = 1.6405       v 2 = 60.10
r 5 = −6.32
d 5 = 0.86              n 3 = 1.8467       v 3 = 23.83
r 6 = −111.958
d 6 = 0.10
r 7 = 14.87 (aspherical)
d 7 = 5.79              n 4 = 1.7725       v 4 = 49.60
r 8 = −8.64
F = 2.997               2w = 122 degrees
```
Aspherical coefficients of the surface of radius r 1
K (cone constant) = 0
D $0.340428 \times 10^{-3}$
E $-0.432607 \times 10^{-5}$
F $0.576946 \times 10^{-7}$
G $-0.356679 \times 10^{-9}$
Aspherical coefficients of the surface of radius r 7
K (cone constant) = 0
D $-0.852530 \times 10^{-3}$
E $-0.947159 \times 10^{-5}$
F $0.151413 \times 10^{-6}$
G $-0.139941 \times 10^{-8}$
and the aspherical surfaces are defined by the equation:

$$z = \frac{Cy^2}{1 + (1 - (1 + k) C^2 y^2)^{\frac{1}{2}}} + Dy^4 + Ey^6 + Fy^8 + Gy^{10}$$

z = pitch in relation to the axial perpendicular plane
y = distance from the optical axis
k = cone constant
D, E, F, G = aspherical coefficients
C = vertex curvature.

2. A high-aperture wide-angle lens assembly, comprising:
a divergent front lens group consisting of at least one lens with considerable effect on distortion correction and relative luminous intensity having a negative refraction decreasing continuously from an optical axis of said assembly outwardly to an edge thereof and with an aspherical front surface;
a relatively large air space following said front lens group and having a thickness of at least three times an overall focal length of the assembly;
a rear lens group separated by said relatively large air space from said front lens group and consisting of at least three lenses including:
a first convergent lens group consisting of a cemented element, and
a second convergent lens group separated by a small air space from said first convergent lens group and having an effect on spherical aberration and image field convexity, said rear lens group having a positive refracting action continuously decreasing from said optical axis outwardly to an edge by reason of at least one aspherical surface of said second convergent lens group facing said cemented element, said cemented element consisting of two lenses; and
an aperture diaphragm with vignetting action located substantially at the center of the thickness of said relatively large air space for image field correction, said divergent front lens group consisting of a single lens having a front surface which is aspherical and of a radius r 1, a thickness along said axis d 1, a refractive index n 1 and an Abbe coefficient v 1, and a rear surface with a radius of curvature r 2, said relatively large air space having a thickness d 2 between said front lens group and said diaphragm and a thickness d 3 from said diaphragm to a front surface of said cemented element, said diaphragm having an effective radius of curvature r 3, said front surface of said cemented element having a radius r 4 of a front lens of said cemented element with a thickness d 4 along said axis, a refractive index n 2 and an Abbe coefficient v 2, a rear surface of said front lens of said cemented element and a front surface of a rear lens thereof having a radius r 5, said rear lens having a thickness along said axis d 5, a refractive index n 3 and an Abbe coefficient v 3, a rear surface of said rear leans of said cemented element having a radius r 6 and being separated by said small air space d 6 from an aspherical front surface of said second convergent lens group having a radius r 7, a thickness d 7, a refractive index n 4, an Abbe coefficient v 4 and a rear surface with a radius r 8, the lens assembly being characterized by the following data ±5%.

```
r 1 = 381.11 (aspherical)
d 1 = 1.17              n 1 = 1.7192       v 1 = 54.70
r 2 = 5.088
d 2 = 8.64
r 3 = ∞
d 3 = 6.19
r 4 = 12.53
d 4 = 7.30              n 2 = 1.7725       v 2 = 49.60
r 5 = −5.64
d 5 = 0.86              n 3 = 1.8467       v 3 = 23.83
r 6 = 279.392
d 6 = 0.40
r 7 = 13.954 (aspherical)
d 7 = 5.27              n 4 = 1.7292       v 4 = 54.70
r 8 = −8.48 (aspherical)
F = 2.762               2w = 132 degrees
```
Aspherical coefficients of the surface of radius r 1
K (cone constant) = 0
D $0.315830 \times 10^{-3}$
E $-0.192608 \times 10^{-6}$
F $0.849578 \times 10^{-8}$
Aspherical coefficients of the surface of radius r 7
K (cone constant) = 0
D $-0.767120 \times 10^{-3}$
E $0.438289 \times 10^{-5}$
F $-0.359959 \times 10^{-6}$
G $0.204217 \times 10^{-8}$
Aspherical coefficients of the surface with radius r 8
K (cone constant) = 0
D $0.193377 \times 10^{-3}$
E $-0.100577 \times 10^{-5}$
F $-0.520482 \times 10^{-7}$
defined by the equation:

$$z = \frac{Cy^2}{1 + (1 - (1 + k) C^2 y^2)^{\frac{1}{2}}} + Dy^4 + Ey^6 + Fy^8 + Gy^{10}$$

z = pitch in relation to the axial perpendicular plane
y = distance from the optical axis
k = cone constant
D, E, F, G = aspherical coefficients
C = vertex curvature.

3. A high-aperture wide-angle lens assembly, comprising:
a divergent front lens group consisting of at least one lens with considerable effect on distortion correction and relative luminous intensity having a negative refraction decreasing continuously from an optical axis of said assembly outwardly to an edge thereof and with an aspherical front surface;

a relatively large air space following said front lens group and having a thickness of at least three times an overall focal length of the assembly;

a rear lens group separated by said relatively large air space from said front lens group and consisting of at least three lenses in the order from an objective side to an image side including:

a first convergent lens group consisting of a cemented element, and     a second convergent lens group separated by a small air space from said first convergent lens group and having an effect on spherical aberration and image field convexity, said rear lens group having a positive refracting action continuously decreasing from said optical axis outwardly to an edge by reason of at least one aspherical surface of said second convergent lens group facing said cemented element, said cemented element consisting of two lenses; and an aperture diaphragm with vignetting action located substantially at the center of the thickness of said relatively large air space for image field correction.

4. The high aperture wide-angle assembly defined in claim 3 wherein the air space between said front lens group and said rear lens group is approximately 0.25 to 0.7 times the overall height of the lens assembly.

5. The high aperture wide-angle assembly defined in claim 4 wherein the width of said air space corresponds to 0.3 to 0.7 times said height.

6. The high aperture wide-angle assembly defined in claim 4 wherein the width of said air space corresponds approximately to 0.25 to 0.45 times said overall height.

7. The high aperture wide-angle assembly defined in claim 4 wherein said rear lens group has, in addition to said cemented element, a further group consisting of two convergent biconvex lenses.

8. The high aperture wide-angle assembly defined in claim 7 wherein said front lens group is a cemented element consisting of two lenses.

9. The high aperture wide-angle assembly defined in claim 8 wherein said assembly consists essentially of, from front to rear, a first lens having an aspherical front surface of radius r 1, a thickness along said axis d 1, a refractive index n 1 and an Abbe coefficient v 1 and a rear surface of radius r 2;

a second lens cemented to said first lens and having a front surface with said radius r 2, a rear surface of radius r 3, a thickness along said axis d 2, a refractive index n 2 and an Abbe coefficient v 2;

an air space d 3 separating said rear surface of said second lens from said diaphragm of a thickness d 3 along said axis;

an effective radius r 4 of said diaphragm;

an air space of a thickness d 4 extending rearwardly from said diaphragm;

a third lens forming a front lens of said cemented element with a front surface having a radius r 5, and a rear surface of a radius r 6 a thickness d 5, a refractive index n 3 and an Abbe coefficient v 3;

a fourth lens forming a rear lens of said cemented element and having a front surface of said radius r 6, a rear surface of a radius r 7, a thickness d 6, a refractive index n 4 and an Abbe coefficient v 4;

an air space of thickness d 7 separating said fourth lens from a fifth lens;

said fifth lens having an aspherical front surface of radius r 8, a rear surface of radius r 9, a thickness d 8, a refractive index n 5 and an Abbe coefficient v 5;

an air space of thickness d 9 separating said fifth lens from a sixth lens;

said sixth lens having a front surface with a radius r 10, a rear surface with a radius r 11, a thickness d 10, a refractive index n 6 and an Abbe coefficient v 6, said lens assembly being characterized by the following data ±5%:

| | | |
|---|---|---|
| r 1 = 226.231 (aspherical) | | |
| d 1 = 2.60 | n 1 = 1.7847 | v 1 = 25/76 |
| r 2 = 43.600 | | |
| d 2 = 1.20 | n 2 = 1.8032 | v 2 = 46.38 |
| r 3 = 3.490 | | |
| d 3 = 5.48 | | |
| r 4 = ∞ | | |
| d 4 = 3.13 | | |
| r 5 = 8.766 | | |
| d 5 = 5.63 | n 3 = 1.8042 | v 3 = 46.50 |
| r 6 = −4.097 | | |
| d 6 = 1.15 | n 4 = 1.9176 | v 4 = 21.51 |
| r 7 = 27.650 | | |
| d 7 = 0.08 | | |
| r 8 = 11.004 (aspherical) | | |
| d 8 = 3.29 | n 5 = 1.7433 | v 5 = 49.20 |
| r 9 = −8.212 | | |
| d 9 = 0.03 | | |
| r 10 = 10.765 | | |
| d 10 = 3.32 | n 6 = 1.7292 | v 6 = 54.70 |
| r 11 = −25.66 | | |
| f = 1.846 mm | 2w = 148 degrees | |

Aspherical coefficients of the first lens surface

K (cone constant) = 0
D $0.310441 \times 10^{-3}$
E $-0.179084 \times 10^{-5}$
F $0.710398 \times 10^{-8}$ Aspherical coefficients of the eighth surface K (cone constant) = 0
D $-0.168858 \times 10^{-2}$
E $0.244339 \times 10^{-4}$
F $-0.639913 \times 10^{-6}$ aspherical surfaces being defined by the equation:

$$z = \frac{Cy^2}{1 + (1 - (1 + k) C^2 y^2)^{\frac{1}{2}}} + Dy^4 + Ey^6 + Fy^8 + Gy^{10}$$

z = pitch in relation to the axial perpendicular plane
y = distance from the optical axis
k = cone constant
D, E, F, G = aspherical coefficients
C = vertex curvature.

10. The high aperture wide-angle assembly defined in claim 3 wherein said rear lens group has, in addition to said cemented element, only a single positive lens.

* * * * *